US012787940B2

(12) United States Patent
Van Der Vegte et al.

(10) Patent No.: US 12,787,940 B2
(45) Date of Patent: Nov. 10, 2026

(54) CUTTER DEVICE FOR AN AGRICULTURAL HARVESTER

(71) Applicant: Kuhn-Geldrop B.V., Geldrop (NL)

(72) Inventors: Bernardus Gerhardus Johannes Van Der Vegte, Nuenen (NL); Roy Petrus Johannes Bax, Leende (NL)

(73) Assignee: Kuhn-Geldrop B.V., Geldrop (NL)

( * ) Notice: Subject to any disclaimer, the term of this patent is extended or adjusted under 35 U.S.C. 154(b) by 354 days.

(21) Appl. No.: 18/540,179

(22) Filed: Dec. 14, 2023

(65) Prior Publication Data

US 2024/0196799 A1 Jun. 20, 2024

(30) Foreign Application Priority Data

Dec. 14, 2022 (GB) ..................................... 2218840
Jun. 1, 2023 (GB) ..................................... 2308217
Jun. 9, 2023 (GB) ..................................... 2308649

(51) Int. Cl.
*A01D 90/04* (2006.01)
*A01F 15/10* (2006.01)
(Continued)

(52) U.S. Cl.
CPC ............ *A01D 90/04* (2013.01); *A01F 15/106* (2013.01); *A01F 29/025* (2013.01); *A01D 89/001* (2013.01); *A01F 2015/107* (2013.01)

(58) Field of Classification Search
CPC .... A01D 43/086; A01D 43/088; A01D 57/01; A01D 89/001; A01D 90/04;
(Continued)

(56) References Cited

U.S. PATENT DOCUMENTS 6,912,835 B1 7/2005 Chabassier
2008/0028737 A1 2/2008 Viaud et al.
(Continued)

FOREIGN PATENT DOCUMENTS

CN 217608451 U 10/2022
DE 10 2012 003 016 B3 8/2013
(Continued)

OTHER PUBLICATIONS

Extended European Search Report issued Sep. 16, 2024 in European Patent Application No. 23216277.6, citing document 15 therein. 11 pages.
(Continued)

*Primary Examiner* — Robert E Pezzuto
(74) *Attorney, Agent, or Firm* — Oblon, McClelland, Maier & Neustadt, L.L.P.

(57) ABSTRACT

A cutter device for an agricultural harvester comprises a rotor with a plurality of tines, a knife that is adjustable between a cutting position and a non-cutting position, and a positioning device that controls movement of the knife. The positioning device is adjustable between (i) a first position in which it positions the knife in the cutting position, (ii) a second position in which it positions the knife in the non-cutting position, and (iii) a third position in which it is disengaged from the knife to allow movement of the knife independently of the positioning device. The positioning device is configured to engage the knife and prevent significant movement of the knife independently of the positioning device when the positioning device is in the first position and at intermediate positions between the first position and the second position.

23 Claims, 13 Drawing Sheets

(51) Int. Cl.
*A01F 29/02* (2006.01)
*A01F 29/09* (2010.01)
*A01D 89/00* (2006.01)

(58) Field of Classification Search
CPC ........ A01F 15/106; A01F 15/10; A01F 15/07; A01F 29/025; A01F 2015/107
See application file for complete search history.

(56) References Cited

U.S. PATENT DOCUMENTS

| | | | | |
|---|---|---|---|---|
| 2016/0029567 | A1 | 2/2016 | Meiners | |
| 2016/0219789 | A1 | 8/2016 | Derscheid et al. | |
| 2020/0093068 | A1 | 3/2020 | Claeys et al. | |
| 2022/0000026 | A1* | 1/2022 | Claeys | A01D 43/088 |
| 2023/0157213 | A1* | 5/2023 | Figgins | A01F 15/106 56/341 |

FOREIGN PATENT DOCUMENTS

| | | | |
|---|---|---|---|
| EP | 2 939 521 | B1 | 7/2017 |
| EP | 3 729 953 | A1 | 10/2020 |
| EP | 3 732 953 | A1 | 11/2020 |
| EP | 4 186 351 | A1 | 5/2023 |
| WO | WO 2014/129892 | A1 | 8/2014 |

OTHER PUBLICATIONS

Search Report under Section 17 issued Jun. 6, 2023, in corresponding United Kingdom Patent Application No. GB2218840.3, citing documents 1, 11 therein, 1 page.

Combined Search and Examination Report under Sections 17 & 18(3) issued Jun. 7, 2023, in corresponding United Kingdom Patent Application No. GB2218840.3, citing documents 1, 11 therein, 1 page.

Search Report under Section 17 issued Nov. 24, 2023, in corresponding United Kingdom Patent Application No. GB2308217.5, citing documents 2, 3, 13, 14 therein, 1 page.

Combined Search and Examination Report under Sections 17 & 18(3) issued Nov. 27, 2023, in corresponding United Kingdom Patent Application No. GB2308217.5, 1 page.

Search Report under Section 17 issued Dec. 5, 2023, in corresponding United Kingdom Patent Application No. GB2308649.9, citing documents 4, 5, 15, 16 therein, 1 page.

Combined Search and Examination Report under Sections 17 & 18(3) issued Dec. 6, 2023, in corresponding United Kingdom Patent Application No. GB2308649.9, 1 page.

* cited by examiner

CUTTER DEVICE FOR AN AGRICULTURAL HARVESTER

FIELD OF THE INVENTION

The present invention relates to a cutter device for an agricultural harvester, for example a round baler, a square baler or a loading wagon.

The invention also relates to an agricultural harvester comprising a crop pickup device, a crop receiving station and a cutter device, a method of detaching a replaceable knife from a cutter device of an agricultural harvester, and a knife for a cutter device of an agricultural harvester.

The agricultural harvester may for example be a round baler of the fixed chamber or variable chamber type, examples of which are described in EP 3157321 and EP 3021659. In the case of a round baler the crop receiving station may comprise the baling chamber in which crop material is rotated and pressed to make a round bale. Alternatively, the agricultural harvester may be a square baler, an example of which is described in EP 3038452 and the crop receiving station may in that case be the pre-chamber in which crop material is collected before being transferred to the baling chamber where it is compressed by a reciprocating plunger to form a square bale. Alternatively, the agricultural harvester may be a loading wagon, an example of which is described in DE 102013007304, in which the crop receiving station is a loading platform on which the crop material is gathered.

BACKGROUND

The purpose of the cutter device is to receive crop material from the pickup device and transport the crop material along the feed path to the crop receiving station. The cutter device is configured to cut the crop material when required for improved handling. For example, if the crop material is grass the cutter device may be configured to cut the stalks of the grass into shorter lengths. Cutting of the crop material is optional and the cutter device may be configured for either cutting or non-cutting operation.

Typically, the cutter device of an agricultural harvester comprises a rotating rotor consisting of a tube that carries a plurality of radially-extending tines. The tines of the rotating rotor carry the crop material forward along a feed path that is defined in part by a bottom plate. A plurality of knives extend upwards through slots in the bottom plate into the feed path of the crop material. The knives cooperate with the tines of the rotating rotor to cut the crop material. The knives may also optionally be withdrawn from the feed path and placed in a non-cutting position below the bottom plate so that the crop material is transferred by the rotor along the feed path without being cut. Optionally, some of the knives may be placed in the cutting position while others of the knives are held in the non-cutting position or are allowed to return to the non-cutting position, to adjust the cut length of the crop material. A retainer device, for example comprising a comb, may be provided to remove crop material from the tines of the rotating rotor. The knives may be provided with an overload protection mechanism, that allows the knives to be pressed downwards against a resilient element from the cutting position towards the non-cutting position, for example when an obstacle such as a stone passes through the feed path. An example of a cutter device is described in WO 2011144349 A1.

Occasionally, it may be necessary to remove one or more of the knives for maintenance purposes, for example to allow sharpening or replacement of the knives. The cutter device may therefore be designed to enable removal and replacement of individual knives when required. For example, EP 1584226 B1 describes a cutter device in which each knife is attached at its front end to a pivot shaft and is controlled by a positioning device that engages a forward facing slot in a lower part of the knife. The knife can be removed by rotating the pivot shaft from a locked position to an unlocked position and then pushing the knife backwards (i.e. in the direction of crop flow along the feed path) to disengage the knife from the pivot shaft and the positioning device, so that it can be removed. This operation has to be completed while the knife is in the cutting position.

There are a number of technical problems with the mechanism described in EP 1584226. These include the following:

- Shifting the knife to the rear may be difficult owing to the presence of dirt (e.g. soil and crop material) in the slots in the bottom plate.
- All of the knives must be placed in the cutting position in order to replace any one of the knives, requiring operation of the knife positioning system.
- The knives and the positioning devices may be mounted in a cassette, which can be shifted laterally from a working position to a maintenance position to allow easier access to the knives. However, the positioning mechanism and the overload protection system must also then be incorporated into the cassette, which makes it very heavy.

Other cutter devices are known, for example from EP 2110014, in which the knife is positively driven from the non-cutting position to the cutting position by a positioning device but is not positively driven from the cutting position to the non-cutting position. Instead, the knife falls from the cutting position to the non-cutting position under gravity after the positioning device has released the knife from the cutting position. This can result in the knife failing to return fully to the non-cutting position, for example when the slots in the bottom plate are contaminated with dirt.

SUMMARY

It is an object of the present invention to provide a cutter device for an agricultural harvester that overcomes or mitigates one or more of the aforesaid technical problems.

According to one aspect of the invention there is provided a cutter device for an agricultural harvester, comprising:

- a rotor with a plurality of tines, wherein the rotor is rotatable to transfer an agricultural crop along a feed path,
- at least one knife that is adjustable between (i) a cutting position in the feed path in which it cooperates with the rotor to cut the crop, and (ii) a non-cutting position in which it is withdrawn from the feed path, and
- a positioning device that controls movement of the knife between the cutting position and the non-cutting position, wherein the positioning device is adjustable between (i) a first position in which it positions the knife in the cutting position, (ii) a second position in which it positions the knife in the non-cutting position, and (iii) a third position in which it is disengaged from the knife to allow movement of the knife independently of the positioning device, wherein the positioning device is configured to engage the knife and prevent significant movement of the knife independently of the positioning device when the positioning device is in the first position and at intermediate positions between the first position and the second position.

The cutter device is designed to enable removal and replacement of individual knives when required and provides one or more of the following advantages:

Rotating the knife for removal may be easier owing to the positive connection between the knife and the positioning device, which helps to remove any dirt (e.g. soil and crop material) from the slots in the base plate as the knife is moved positively to the non-cutting position.

The knives may be placed individually or in groups in the cutting position in order to replace one or more of the knives, without operating the knife positioning system to position the knives in the cutting position.

If the knives and the positioning devices are mounted in a cassette, it is not necessary to include the knife positioning devices in the cassette.

In an embodiment of the invention, the positioning device is configured to engage the knife and prevent significant movement of the knife independently of the positioning device when the positioning device is in the first position and at intermediate positions between the first position and the second position. In this configuration the knife is positively connected to the positioning device with the result that the knife cannot move significantly relative to the positioning device.

The term "disengaged" may cover both full disengagement and partial disengagement, wherein rotation of the knife from the non-cutting position towards the cutting position is still allowed.

The cutter device may include a plurality of knives, wherein each knife preferably has an associated positioning device, and wherein the knives are configured to move separately or together or in groups between the cutting and non-cutting positions.

It is noted that the phrase "independently of the positioning device" requires movement of the knife both towards the cutting position and towards the non-cutting position.

Optionally, the knife is pivotable about a pivot axis located towards a front part of the knife. The front part is defined with respect to the direction of crop flow along the feed path.

Optionally, the pivot axis is defined by a pivot shaft, and wherein the pivot shaft and the knife have complementary locking formation that lock the knife to the pivot shaft in a first configuration and allow separation of the knife from the pivot shaft in a second configuration.

Optionally, the pivot shaft and the knife are adjustable between the first configuration and the second configuration by rotation of the knife and/or the pivot shaft. For example, the pivot shaft may comprise a partially cylindrical shaft with a pair of flattened faces that can pass through an open slot in the knife in the second configuration but not in the first configuration. The open slot can open at front side of the knife. The open slot can flare outwards towards the front side of the knife. Alternative mechanisms may be used, as known to the skilled person.

Optionally, the positioning device is configured to engage the knife at a location towards a rear part of the knife, wherein the rear end is defined with respect to the direction of crop flow along the feed path.

Optionally, the positioning device and the knife have complementary engaging formations configured to maintain engagement between the positioning device and the knife in the first position and all intermediate positions in between the first and the second position, and to permit disengagement of the positioning device from the knife in the third position at least in the direction of the cutting position.

Optionally, the engaging formations are configured to limit relative movement between the positioning device and the knife in a tangential direction relative to the pivot axis of the knife, and to permit relative movement between the positioning device and the knife in a radial direction relative to the pivot axis of the knife.

Optionally, the positioning device is configured to disengage the knife in the third position by radial movement of the knife relative to the pivot axis.

Optionally, the engaging formations comprise a rearwards-facing slot that opens through a rear edge of the knife and an engaging element provided on the positioning device that engages the slot. The engaging element provided on the positioning device may for example comprise a pin. Other engaging formations may also be used.

Optionally, the rearwards-facing slot extends substantially in the direction of the pivot axis of the knife, for example in a substantially radial direction with respect to the pivot axis.

Optionally, the maximum length of the rewards-facing slot is greater than the maximum width of the rearwards-facing slot. The maximum length of the rewards-facing slot is measured from the rear edge of the knife immediately adjacent the opening of the rearwards-facing slot along the length of the slot, which is typically in a direction generally towards the open slot arranged to receive the pivot shaft. The maximum width of the slot is measured in a direction that is orthogonal to the slot length across the width of the slot, which is generally oriented in a direction from the bottom edge to towards the cutting edge. In some embodiments, a first side wall that defines the rearwards-facing slot includes a rectilinear portion that is arranged generally parallel to the bottom edge. Optionally, as the rectilinear portion of the first side wall approaches the rear edge of the knife, the first side wall curves upwards, that is, in a direction away from the bottom edge. In some embodiments, a second side wall that defines the slot flares away from the first side wall in the direction of the rear edge. Optionally, the first wall is located above the second wall, such that the second wall flares outwards and downwards from the first wall. By "flares" of "flaring" it is meant in a rectilinear and/or curvilinear fashions.

Optionally, the positioning device is pivotable about a pivot axis of the positioning device, which is located towards a rear end of the positioning device.

Optionally, the positioning device is arranged such that when the knife is at an intermediate position approximately mid-way between the cutting position and the non-cutting position, there is substantial alignment between the pivot axis of the knife, the engaging formations and the pivot axis of the positioning device.

Optionally, the cutter device includes a control mechanism that controls movement of the positioning device between the first position and the third position.

Optionally, the control mechanism includes a control element that is connected to the positioning device, and an actuator that is connected to the control element and is configured to move the control element between a primary position and a secondary position. The control element may for example comprise a transverse bar that extends across the width of the cutter device parallel to the axis of the rotor. The control element may be connected to one or more positioning devices, causing the knives connected to each of those positioning devices to move together between the cutting and non-cutting positions.

Optionally, the control element is configured for pivoting movement about a pivot axis of the control element between the primary position and the secondary position.

Optionally, the pivot axis of the control element is offset from the pivot axis of the positioning device.

Optionally, the control mechanism includes a connecting element that is connected to the positioning device.

Optionally, the connecting element comprises a resilient element that is configured to enable movement of the positioning device relative to the control element by deformation of the resilient element. This provides an overload protection mechanism that allows the knife to move from the cutting position to the non-cutting position when subjected to an overload force, for example when an obstruction such as a rock passes along the feed path between the rotor and the knife.

Optionally, the resilient element comprises a kink spring, a coil spring or a flat spring.

Optionally, the control mechanism includes a selection device. The selection device can be arranged to select between a first operational mode wherein the knife is selected and a second operational mode wherein the knife is de-selected.

Optionally, the control mechanism comprises a selection element, such as a selection lever, located between the resilient element and the control element. The selection element can be arranged to control the connection between the resilient element and control element.

Optionally, the selection device can be arranged to control movement of the selection element, thereby selecting between the first operational mode and the second operational mode.

Optionally, the cutter device includes a bottom plate beneath the rotor, wherein the feed path is located between the rotor and the bottom plate.

Optionally, the bottom plate includes an opening through which the knife extends in the cutting position.

Optionally, the knife has a rear edge that extends at an angle of at least 60° relative to the bottom plate. This may help to prevent crop material being drawn into the opening in the bottom plate when the knife moves from the cutting position to the non-cutting position.

Optionally, the cutter device includes a plurality of knives and each of the plurality of knives has a respective positioning device.

Optionally, each of the plurality of knives has a respective selection device, wherein each respective selection device is arranged to select between a first operational mode wherein its respective knife is selected and a second operational mode wherein its respective knife is de-selected.

Optionally, the plurality of knives are configured to move separately or together or in groups between the cutting and non-cutting positions.

According to another aspect of the invention there is provided an agricultural harvester comprising a crop pick-up device, a crop receiving station and a cutter device as defined by any one of the preceding statements of invention, wherein the cutter device is configured to transfer crop along a feed path from the crop pick-up device to the crop receiving station.

Optionally, the agricultural harvester comprises a round baler, a square baler or a loading wagon.

According to another aspect of the invention there is provided a knife for a cutter device for an agricultural harvester, the knife comprising: a cutting edge comprising a top part of the knife, which is configured to cut an agricultural crop moving along a flow path over the knife; a pivot mechanism located towards a front part of the knife, the pivot mechanism comprising a pivot shaft that is partially circular in transverse cross section, a circular hole formed in a front end of the knife and a shaft slot that extends forwards from the circular hole to the front end of the knife, wherein the pivot shaft is insertable into and removal from the circular hole via the shaft slot, and in a condition wherein the pivot shaft is located in the circular hole, the knife is rotatable about the pivot shaft; and an engaging formation comprising a rearwards-facing slot that opens through a rear part of the knife for engaging a positioning device that controls pivoting movement of the knife between a cutting position and a non-cutting position, wherein the rearwards-facing slot extends substantially in the direction of a pivot axis of the knife, and the maximum length of the rewards-facing slot is greater than the maximum width of the rearwards-facing slot.

In some embodiments, the shaft slot can flare outwards towards the front of the knife.

According to another aspect there is provided a knife system for a cutter device for an agricultural harvester, the knife system comprising: a knife; and a pivot mechanism comprising a pivot shaft a pivot located towards a front part of the knife, wherein the pivot shaft is partially circular in transverse cross section; wherein the knife comprises a cutting edge comprising a top part of the knife, which is configured to cut an agricultural crop moving along a flow path over the knife, a circular hole formed in a front end of the knife and a shaft slot that extends forwards from the circular hole to the front end of the knife; the arrangement being such that the pivot shaft is insertable into and removal from the circular hole via the shaft slot, and in a condition wherein the pivot shaft is located in the circular hole, the knife is rotatable about the pivot shaft, and an engaging formation comprising a rearwards-facing slot that opens through a rear part of the knife for engaging a positioning device that controls pivoting movement of the knife between a cutting position and a non-cutting position, wherein the rearwards-facing slot extends substantially in the direction of the pivot axis of the knife, and the maximum length of the rewards-facing slot is greater than the maximum width of the rearwards-facing slot.

According to another aspect of the invention there is provided a method of detaching a replaceable knife from a cutter device of an agricultural harvester, the cutter device comprising a rotor with a plurality of tines that is rotatable to transfer an agricultural crop along a feed path, at least one replaceable knife that is pivotable about a pivot shaft between a cutting position in the feed path in which it cooperates with the rotor to cut the crop, and a non-cutting position in which it is withdrawn from the feed path, and a positioning device that controls movement of the knife between the cutting position and the non-cutting position, wherein the positioning device is adjustable between a first position in which it positions the knife in the cutting position and a second position in which it positions the knife in the non-cutting position, the method comprising:

moving the positioning device to a third position in which it is disengaged from the knife to allow movement of the knife independently of the positioning device from the non-cutting position towards and beyond the cutting position, rotating the knife from the non-cutting position towards and beyond the cutting position, and separating the knife from the pivot shaft.

It is noted that rotating the knife from the non-cutting position towards the cutting position may be completed independently of the positioning device, e.g. by manually rotating the knife.

According to another aspect of the invention there is provided a method of attaching a replaceable knife to a cutter device of an agricultural harvester, the method comprising reversing the steps of the method defined by the preceding statement of invention.

BRIEF DESCRIPTION OF THE DRAWINGS

An embodiment of the invention will now be described by way of example with reference to the accompanying drawings, in which.

DETAILED DESCRIPTION OF EMBODIMENTS OF THE INVENTION

Figure 1:
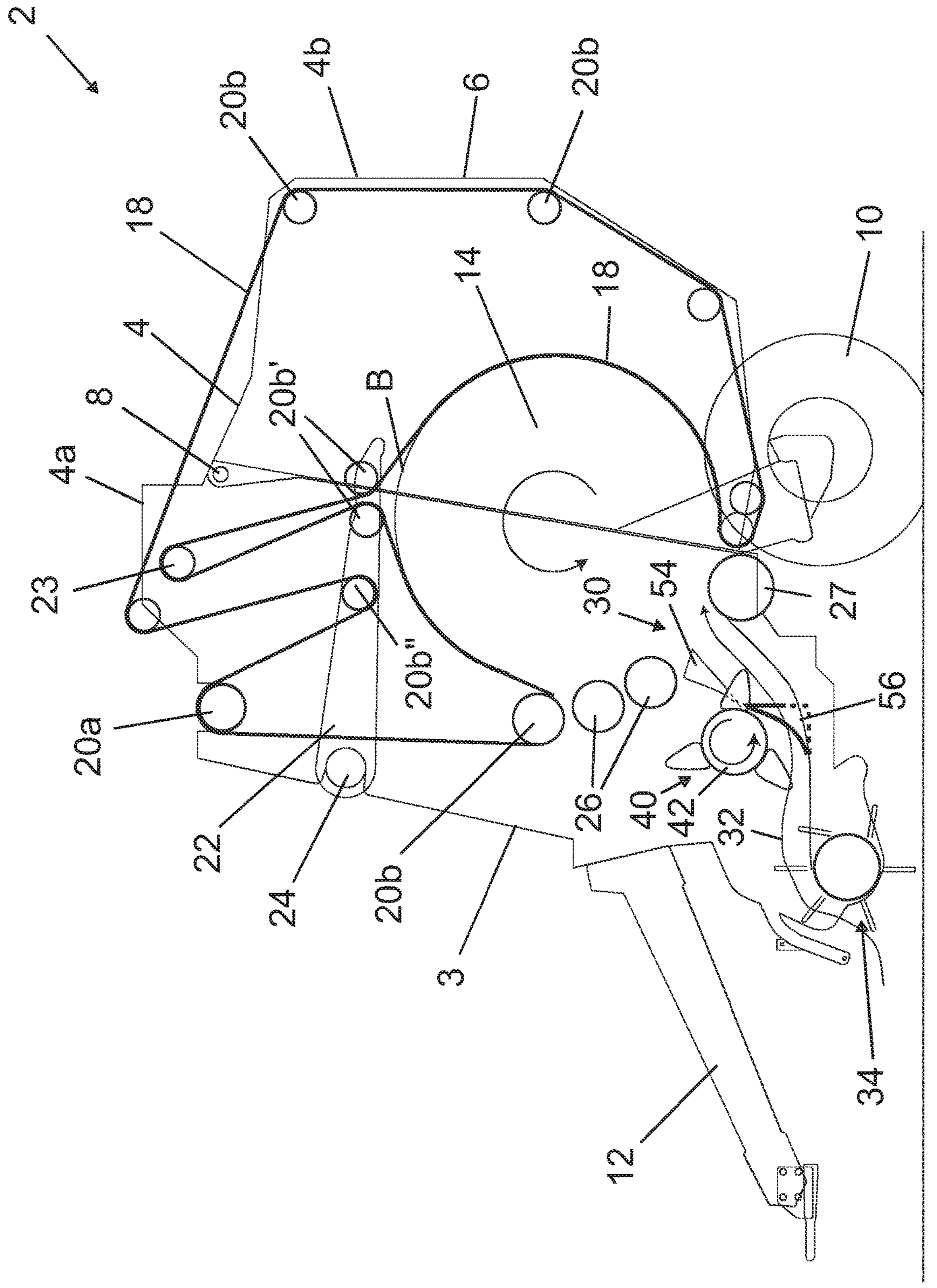
FIG. 1 is a schematic side section of a variable chamber round baler.

As previously noted, the present invention relates to a cutter device for an agricultural harvester, for example a round baler, a square baler or a loading wagon. In FIG. 1 of the accompanying drawings the cutter device is part of a variable chamber round baler. It should be noted that the cutter device may alternatively comprise part of another type of baler, for example a fixed chamber round baler or a square baler, or any other type of agricultural harvester, for example a loading wagon.

The variable chamber round baler 2 shown in FIG. 1 comprises a frame 3 and a housing 4 comprising a fixed part 4*a* and an openable rear part 4*b*, wherein the rear part 4*b* comprises a tailgate 6 that can pivot open about a pivot 8 in the upper part of the housing 4 to release a completed bale from the baler. The frame 3 and the fixed front part 4*a* of the housing 4 optionally comprise a unitary structure. The baler 2 is mounted on wheels 10 and has a drawbar 12 allowing it to be drawn by an agricultural vehicle such as a tractor. The baler 2 is configured to be driven from the power take off unit of the tractor (not shown).

The baler housing 4 encloses a baling chamber 14 within which a round (cylindrical) bale B can be formed from bale material, for example agricultural crop material. A bale forming zone is provided within the baling chamber 14, the shape of the bale forming zone being defined the side walls of the housing 4 and by one or more endless belts 18 that pass around a set of rollers 20*a*, 20*b*. At least one of the rollers is a drive roller 20*a* that is driven via the power take-off unit and drives the belts 18 causing them to rotate around the rollers 20*a*, 20*b*. The other rollers are undriven idler rollers 20*b* that rotate with the belts 18.

Two of the idler rollers 20*b* comprise tensioning rollers 20*b*', which are mounted on a tensioning arm 22. An intermediate roller 23 is located in the belt run between the movable rollers 20*b*'. The intermediate roller 23 guides the belt 18 as it runs from the rear part of the baling chamber 14 around the movable rollers 20*b*' and the intermediate roller 23, and back to the front part of the baling chamber 14. A third roller 20*b*" mounted on the arm 22 takes up any slack and effectively tensions the belts 18 as the arm 22 moves. The tensioning arm 22 can be pivoted about a pivot point 24 to accommodate a change in the size of the bale forming zone defined by the belts 18 within the baling chamber 14. A belt tensioner (not shown), for example a hydraulic or electric actuator, is connected between the tensioning arm 22 and the frame 3 and is operable to adjust the pressure on the tensioning arm 22 and the tension in the belts 18. This affects the degree of compression of the bale material and the density of the bale B.

Optionally, the baling chamber 14 is defined in part by one or more press rollers 26 and/or a starter roller 27, which do not engage the belts 18. The press rollers 26 and the starter roller 27 are located on opposite sides of a feed opening 30 through which bale material is fed into the baling chamber 14. The press rollers 26 and/or the starter roller 27 may optionally be driven rollers.

The baler includes a pick-up mechanism 34 for picking up bale material from the ground and feeding it into the baling chamber 14 along a feed path 32. A cutter device 40 comprising a rotating rotor 42 is provided to drive the bale material along the feed path 32 and optionally to cut the bale material before it enters the baling chamber.

The bale material is circulated within the baling chamber 14 and compressed by the rotating belts 18 and the rollers

20*a*, 20*b*, 26, 27 to form a round bale B. When the bale B has been formed and has reached the desired diameter it is bound with a suitable binding material, typically twine, net or film, which may be fed into the baling chamber 14 from a binding device (not shown) and wrapped around the bale B. The binding material may for example be fed into the baling chamber 14 between the lowermost idler roller 20*b* in the front part 4*a* of the housing and the upper press roller 26. The bound bale can be ejected from the baling chamber 14 onto the ground by opening the tailgate 6.

Except as described below, all the aforesaid features are conventional and they will not therefore be described in further detail.

Figure 2:
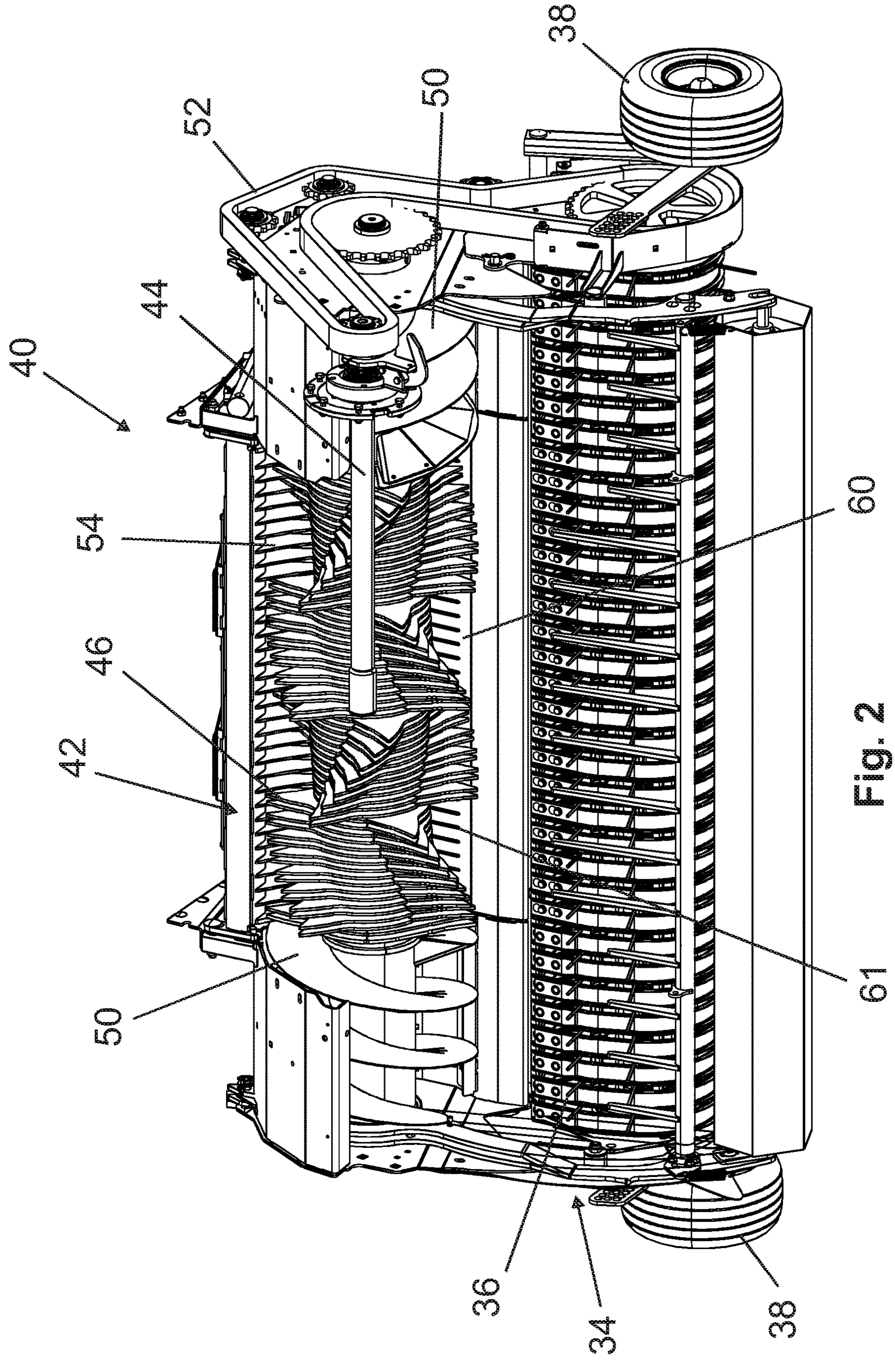
FIG. 2 is an isometric view of a pickup and feed unit.

The pick-up mechanism 34 and the cutter device 40 are shown in more detail in FIG. 2. The pick-up mechanism 34 is conventional and comprises a plurality of pick-up tines 36 that rotate to pick up the crop material from the ground and feed it to the cutter device 40. The pick-up mechanism 34 is supported on the ground by a pair of wheels 38 that are adjustable to adjust the height of the pick-up mechanism 34 above the ground.

The cutter device 40 is positioned above and behind the pick-up mechanism 34 and is configured to drive the bale material along the feed path towards the baling chamber 14.

The cutter device 40 is also operable to cut the bale material if required before it enters the baling chamber 14.

Figure 3:
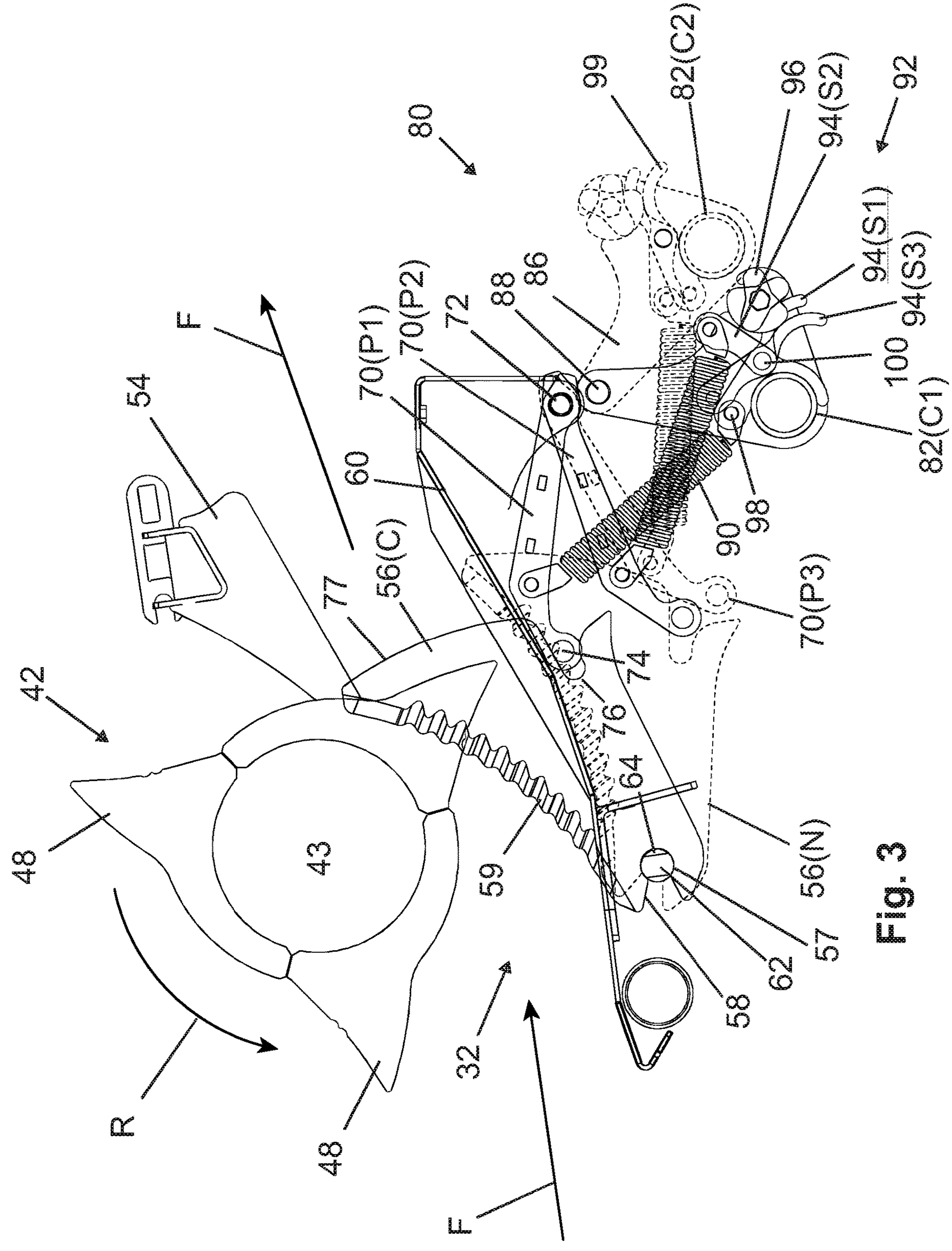
FIG. 3 is a side view of a cutting device, showing a knife in a cutting position and a non-cutting position, and showing a positioning device in a first position, a second position and a third position.

The cutter device 40 includes a rotating rotor 42 comprising a tube 43 and a plurality of tine plates 46 that are mounted on the tube 43. As depicted in FIG. 3, in this embodiment each tine plate 46 comprises three tines 48 that are spaced evenly around the axis of the tube 43, although the number and spacing of the tines may be different. Also in this embodiment the tine plates 46 are preferably attached to the tube 43 in pairs and the pairs of tine plates are set in a helical arrangement in which each pair of tine plates is offset from the adjacent pair of plates on each side thereof. Again, the arrangement of the tine plates 46 on the tube 43 may be different. Optionally, an auger 50 is provided at each end of the drive tube 43 to draw cut crop material inwards from the ends of the pick-up mechanism towards the centre thereof so that it can be fed into the baling chamber 14 by the cutter device 40.

The pick-up mechanism 34 and the cutter device 40 are both driven from a drive chain 52 by a main shaft 44, which is driven from the PTO of the tractor. Alternatively, a different drive mechanism may be provided.

Figure 7:
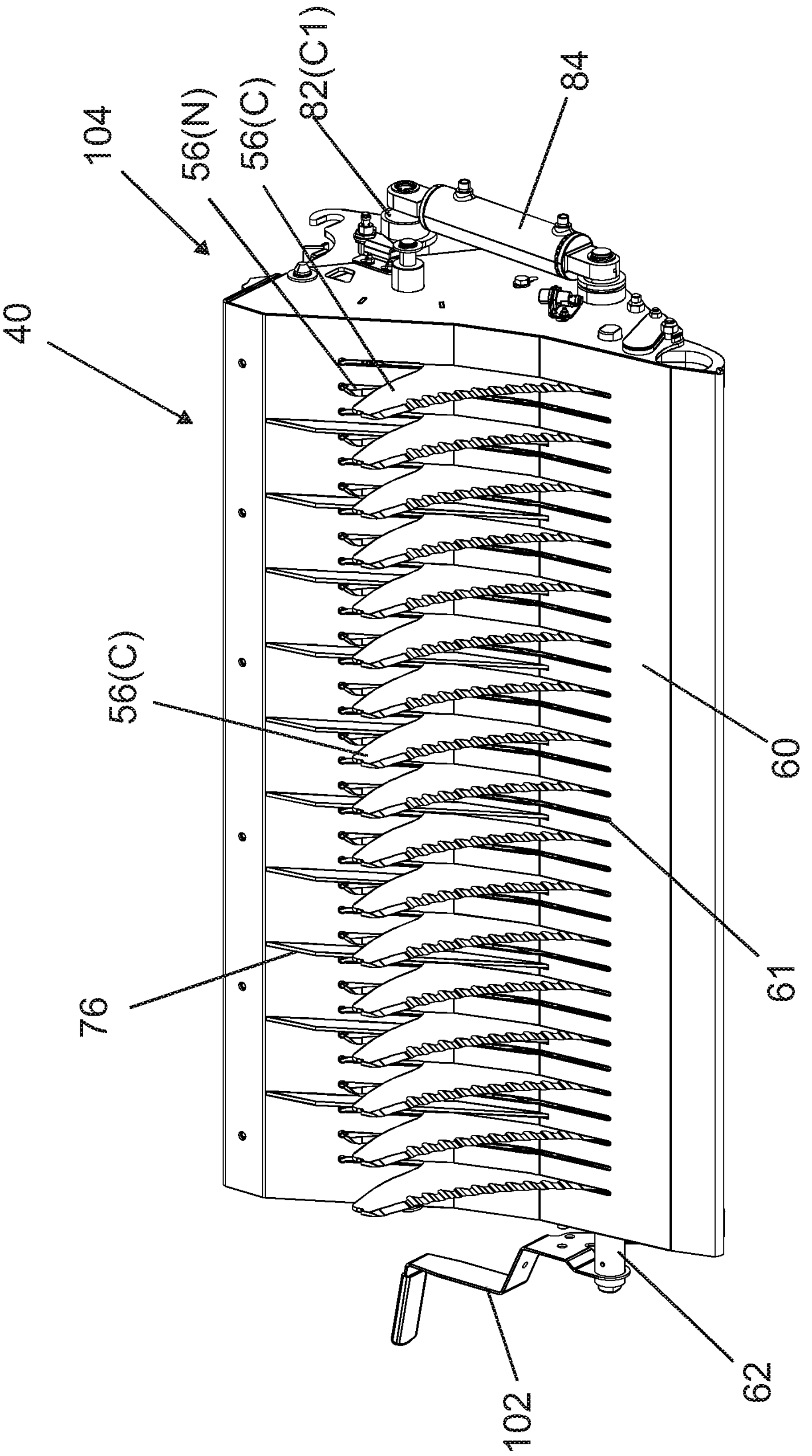
FIG. 7 is an isometric view of a base structure of the cutting device, showing a first set of knives in the cutting position and a second set of knives in the non-cutting position, together with an attached knife detachment handle.
Figure 8:
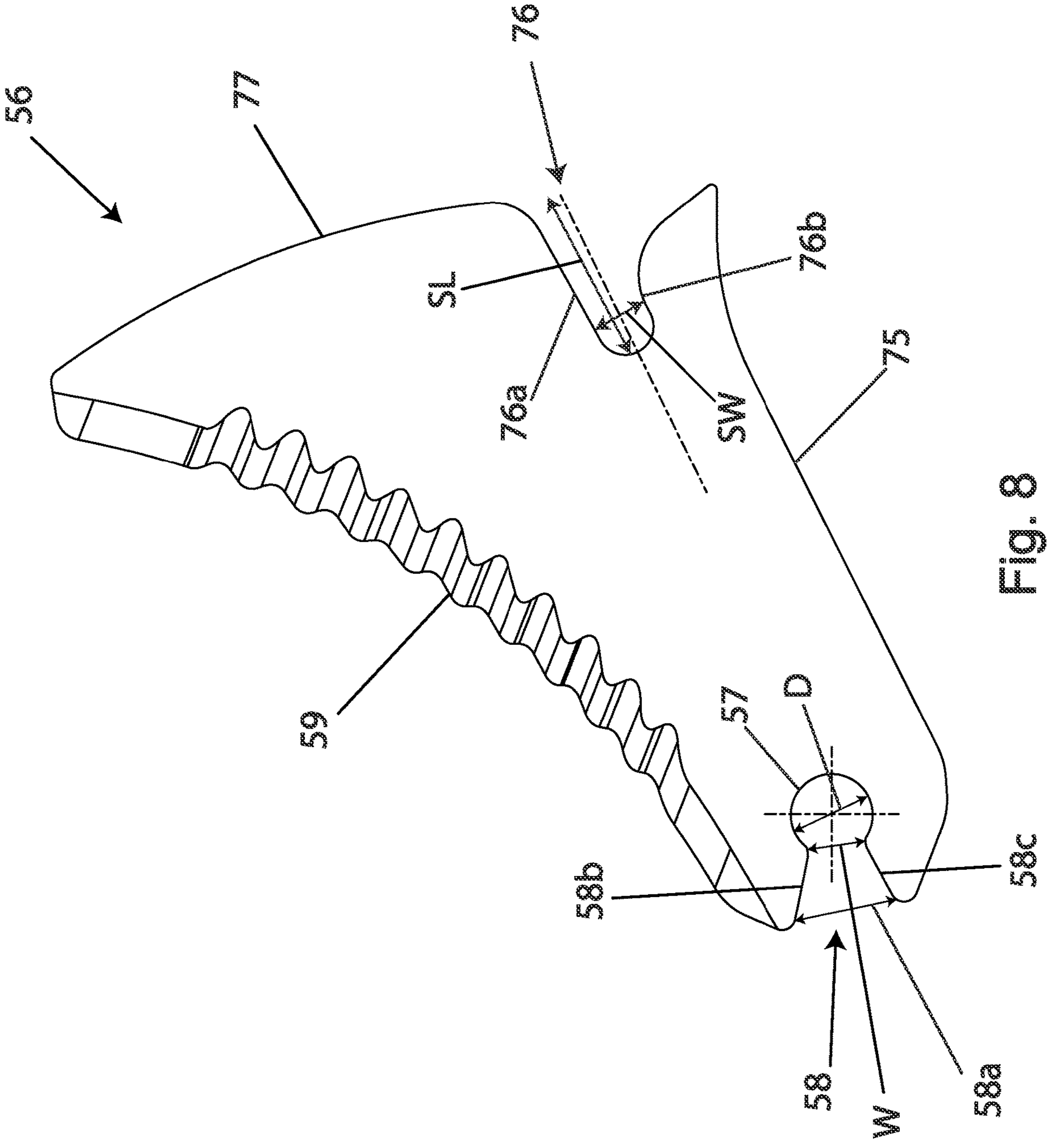
FIG. 8 is a side view of a knife from the cutter device.

As shown in FIGS. 2 and 3, a retainer mechanism 54 in the form of a comb is provided above and behind the rotating rotor 42 to remove cut crop material from the rotor after it has passed along the feed path 32. A plurality of knives 56 are provided below and behind the rotating rotor 42 to cut the crop material as it is carried along the feed path 32 by the rotating rotor 42. The knives 56 extend into the feed path 32 through slots 61 in a bottom plate 60 located beneath the rotating rotor 42. More details of the knife 56 and the bottom plate 60 are shown in FIGS. 7 and 8. Alternatively, the positions of the rotor, the knives and the bottom plate may be inverted, so that the rotor is placed below the plate and the knives (the plate then being referred to as a top plate).

FIG. 3 depicts the main components of the cutter unit 40, including the rotor 42, the retainer mechanism 54, the bottom plate 60 and the knife 56. The rotor 42 rotates in a rotation direction R and feeds crop material along a feed path 32 between the rotor 42 and the bottom plate 60 in a flow direction F.

The knife 56 is shown in solid lines in a raised cutting position C in which it extends into the feed path 32 through a slot 61 in the bottom plate 60. When the knife 56 is in the cutting position C it cooperates with the tines 48 on the rotating rotor 42 to cut the crop material as it is driven along the feed path 32. In this embodiment the knife 56 extends through the gap between a pair of tines 48 so that the tines pass by on opposite sides of the knife 56 to produce a cutting action. The knife 56 has a cutting edge 59, which may be serrated.

The knife 56 is also shown in broken lines in a non-cutting position N in which it is lowered through the slot 61 so that it lies below the bottom plate 60 and does not extend substantially into the feed path 32. When the knife 56 is in the non-cutting position N it does not significantly come into contact with crop material moving along the feed path 32 and the crop material is therefore fed by the rotating rotor 42 to the baling chamber 14 without being cut.

The knife 56 is approximately triangular-shaped and is pivotable between the cutting position C and the non-cutting position N by pivoting about a knife pivot shaft 62 located towards the front end of the knife 56. The pivot shaft 62 is preferably partially circular in cross section and fits within a circular hole 57 provided at the front end of the knife, allowing rotation of the knife 56 about the pivot shaft 62.

The pivot shaft 62 has a pair of flat faces 64 on opposite sides of the shaft, wherein the distance between the faces 64 is less than the diameter of the pivot shaft 62. The knife 56 includes a shaft slot 58 that preferably extends forwards from the hole 57 to the front end of the knife 56. The minimum width W of the shaft slot 58 is greater than the distance between the faces 64, allowing the shaft 62 to pass through the shaft slot 58 when the slot and the faces 64 are aligned. This allows the knife 56 to be attached to and detached from the shaft 62. If the shaft slot 58 is not aligned with the faces 64 of the shaft 62 the knife 56 cannot be detached from the shaft 62.

The shaft slot 58 can be arranged such that the minimum width W of the slot is located adjacent to the hole 57. The shaft slot 58 can be arranged such that the width of the slot at the slot opening 58*a* at the front of the knife is greater than minimum width W of the slot. For example, walls 58*b*,58*c* that define the shaft slot 58 can flare outwards from the hole 57 to the shaft slot opening 58*a*. This facilitates ease of attachment and removal of the knife from the shaft 56.

The pivot shaft 62 and the knife 56 therefore have complementary looking formations comprising the shaft slot 58 and the faces 64 that lock the knife 56 to the pivot shaft 62 in a first configuration and allow separation of the knife from the pivot shaft in a second configuration. The pivot shaft 62 and the knife 56 are adjustable between the first configuration and the second configuration by relative rotation of the knife 56 and the pivot shaft 62. Relative rotation can be achieved by rotating the knife 56 about the pivot shaft 62 and/or by rotating the pivot shaft 62 about its axis.

The knife 56 can be moved between the cutting position C and the non-cutting position N by a positioning device 70. In this employment the positioning device 70 comprises an arm that can be pivoted about a pivot point 72 located at or near the rear end of the positioning device 70. A first engaging formation 74 is provided at the front end of the positioning device 70, which engages a complementary second engaging formation 76 provided towards the rear end of the knife 56. In this embodiment the first engaging formation 74 comprises a pin and the second engaging formation 76 comprises a slot that opens through the lower rear edge 77 of the knife 56. The slot extends forwards towards the pivot axis of the knife 56, which is defined by the axis of the pivot shaft 62.

The positioning device 70 can be pivoted between a first position P1 in which it positions the knife in the cutting position C and a second position P2 in which it positions the knife in the non-cutting position N. The positioning device 70 can also be moved to a third position P3 below the second position P2, in which it is disengaged from the knife 56 to allow the knife to move independently of the positioning device 70, at least towards the cutting position C. The positioning device 70 is thus configured to engage the knife 56 and prevent significant movement of the knife independently of the positioning device 70 when the positioning device is in the first position P1 and at intermediate positions between the first position P1 and the second position P2. The term “significant movement” as used herein means movement that exceeds normal play between the knife 56 and the positioning device 70.

The knife 56 is therefore positively connected to the positioning device 70 at the first position P1 and at intermediate positions between the first position P1 and the second position P2, so that the knife 56 cannot move significantly without corresponding movement of the positioning device 70. When the positioning device 70 is in the third position P3 it is disengaged from the knife, which allows free rotation of the knife 56 from the non-cutting position N towards the cutting position C. The term “disengaged” as used herein covers both full disengagement in which the knife 56 can move entirely independently of the positioning device 70, and partial disengagement wherein the knife 56 can move independently of the positioning device 70 from the non-cutting position N towards the cutting position C, but where movement in the opposite direction from the cutting position C towards the non-cutting position N is not entirely free. It is noted that in this embodiment the second and third positions P2 and P3 are adjacent positions. Alternatively, the second and third positions P2 and P3 may coincide.

The positioning device 70 and the complementary engaging formations 74, 76 may take different forms. For example, the positioning device and the knife may have complementary engaging formations that are configured to maintain engagement between the positioning device and the knife in the first position P1 and the second position P2 and all intermediate positions in between the first and the second position, and to permit disengagement of the positioning device from the knife in the third position P3 at least in the direction of movement towards the cutting position. Optionally, the engaging formations 74, 76 may be configured to limit relative movement between the positioning device 70 and the knife 56 in a tangential direction relative to the pivot axis of the knife, and to permit relative movement between the positioning device and the knife in a radial direction relative to the pivot axis of the knife.

The cutter device also includes a control mechanism 80 that controls movement of the positioning device 70 between the first position P1, the second position P2 and the third position P3. The control mechanism 80 includes a control element 82 that is connected to the positioning device 70, and an actuator 84 (shown in FIG. 7) that is connected to the control element 82 and is configured to move the control element between a primary position C1 and a secondary position C2.

In this embodiment the control element 82 comprises a bar that extends transversely across the cutter device 40 substantially parallel to the axis of the rotor 42. The bar is attached by pivot arms 86 to a pivot axis 88, which is preferably located adjacent to, for example just below, the pivot point 72 of the positioning device 70. The pivot arms 86 pivot about the pivot axis 88, allowing the control element 82 to swing between the primary position C1 that is shown in FIG. 3 in solid lines and the secondary position C2 that is shown in broken lines. In this embodiment the primary position C1 comprises a forward position and the secondary position C2 comprises a rearward position.

The control mechanism 80 further comprises a connecting element 90 that is connected to the positioning device 70. In this embodiment the connecting element 90 comprises a resilient connecting element that is configured to enable movement of the positioning device 70 relative to the control element 82 by deformation of the connecting element 90. The resilient connecting element 90 may for example comprise a kink spring, a coil spring or a flat spring. As described below, resilient connecting element 90 provides an overload protection mechanism 91 that allows the knife 56 to move from the cutting position C to the non-cutting position N when subjected to an overload force, for example when an obstruction such as a rock passes along the feed path between the rotor and the knife.

The connecting element 90 may be connected to the control element 82 by a selection mechanism 92 that enables alternative connection configurations between the positioning device 70 and the knife 56 to be selected. These alternative connection configurations include a selected configuration in which the positioning device 70 engages the knife and controls movement of the knife between the cutting position C and the non-cutting position N, and a de-selected (or non-selected) configuration in which the positioning device 70 allows the knife to return to the non-cutting position N, regardless of the position of the control element 82.

In an embodiment, when a knife 56 is deselected it is brought first to an intermediate position between the cutting position N and the non-cutting position N, and the positioning device then allows the knife to fall from the intermediate position to the non-cutting position.

The selection mechanism allows a user to select which of the plurality of knives 56 are moved to the cutting position C when the control element 82 moves from the secondary position C2 to the primary position C1. The unselected knives are moved partially from the non-cutting position N to the cutting position C. The knives may return to the non-cutting position N under the force of gravity and/or as a result of being pressed downwards by bale material passing along the feed path 32.

In the embodiment shown in the drawings the selection mechanism 92 comprises a selection lever 94 and a selection control 96. The selection lever 94 has a first end 98 that is attached to the connecting element 90 and a free second end 99. The selection lever 94 is attached to the pivot arm 86 through a pivot connection 100 that is located between the first and second ends 98, 99. The selection lever 94 can be pivoted between a first position S1 in which the first end 98 engages the control element 82 and a second position S2 in which the second end 99 engages the control element 82.

In this embodiment the selection control 96 comprises a radial cam surface 97 that can engage the second end 99 of the selection lever 94. The selection control 96 can be rotated to adjust the position of the selection lever 94 between the first position S1 in which the first end 98 engages the control element 82 and an intermediate third position S3 between the first position S1 and the second position S2, in which the first end 98 disengages the control element 82. Subsequent movement of the selection lever 94 between the third position S3 and the second position S2 will be described below.

Figure 4:
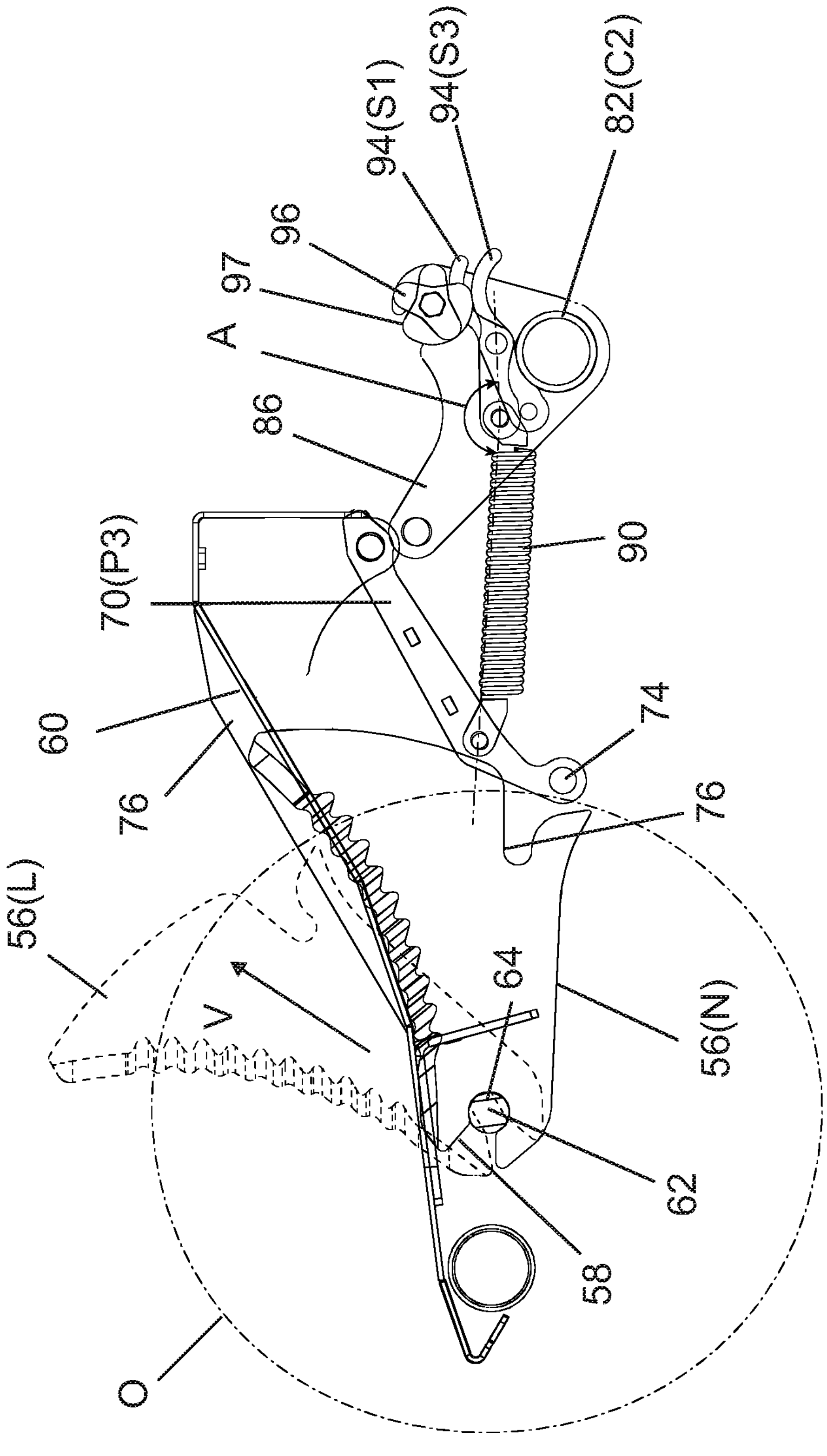
FIG. 4 is a side view of a knife mechanism, showing the positioning device in the third position and showing the knife in the non-cutting position and a detaching position.

FIG. 4 shows the positioning device 70 in the third position P3 in which the first engaging formation 74, e.g. comprising a pin, is withdrawn from the second engaging formation 76 comprising the slot that opens through the rear edge 77 of the knife, so that the positioning device 70 is disengaged from the knife 56. This allows the knife 56 to move independently of the positioning device 70. The knife 56 is shown in solid lines in the non-cutting position N and also in broken lines in the detachment or removal position L, in which the knife is rotated beyond the cutting position C. Owing to the disengagement of the positioning device 70 the knife 56 can be rotated freely, for example by hand, in a circular path O around the pivot shaft 62 from the non-cutting position N to the removal position L.

The pivot shaft 62 can also if necessary be rotated about its axis from a locked configuration shown in solid lines to an unlocked configuration shown in broken lines in which the faces 64 on the sides of the shaft are aligned with the shaft slot 58 of the knife 56. This allows the knife 56 to be removed by pulling it rearwards in a removal direction V. A knife detachment handle 102, for example as shown in FIG. 7, may optionally be provided for rotating the pivot shaft 62.

Figure 5:
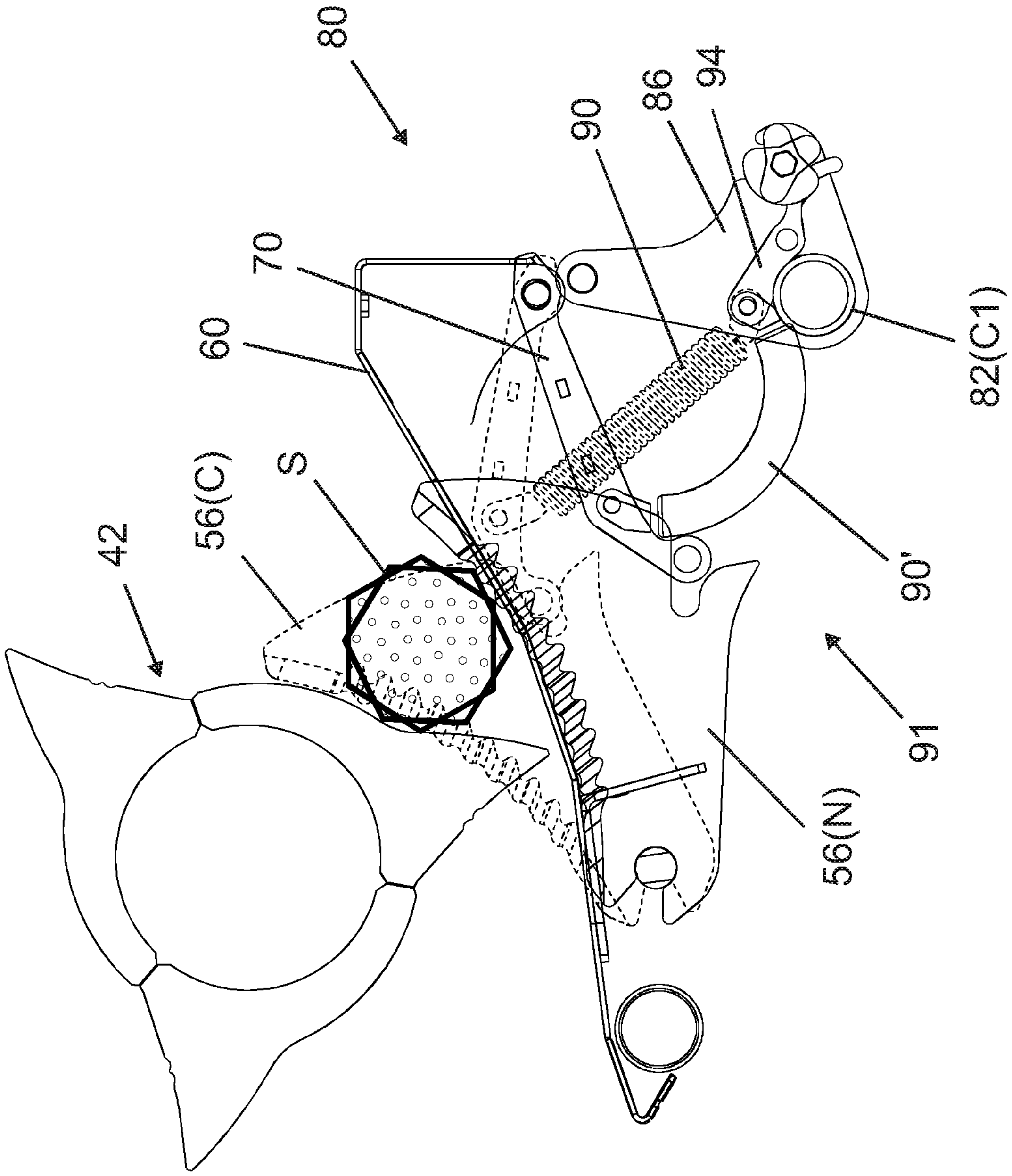
FIG. 5 is a side view of the cutting device, showing the knife in the cutting position and displaced towards the non-cutting position in response to an obstacle moving along a feed path.

FIG. 5 illustrates operation of the overload protection mechanism 91 that allows the knife 56 to move from the cutting position C towards the non-cutting position N when subjected to an overload force, for example when an obstruction S such as a stone or rock passes along the feed path between the rotor 42 and the knife 56.

The control mechanism 80 comprises a connecting element 90 that is connected between the selection lever 94 and the positioning device 70. In this embodiment the connecting element 90 comprises a resilient connecting element, for example a kink spring, a coil spring or a flat spring. The resilient connecting element 90 is configured to enable movement of the positioning device 70 relative to the control element 82 by deformation of the connecting element 90.

For example, if an obstruction S such as a stone or rock passes along the feed path between the rotor 42 and the knife 56, the obstruction may press the knife 56 downwards from the cutting position C as shown in broken lines towards the non-cutting position N shown in solid lines, allowing the obstruction S to pass along the feed path without damaging either the rotor 42 or the knife 56. The force applied by the obstruction S to the knife 56 causes the resilient connecting element 90 to deform elastically, for example by bending. In FIG. 5 the deformed connecting element 90' is shown in solid lines. After the obstruction S has passed, the resilient connecting element 90 resumes its normal undeformed shape as shown in broken lines, thereby returning the knife 56 to the cutting position C.

Figure 6:
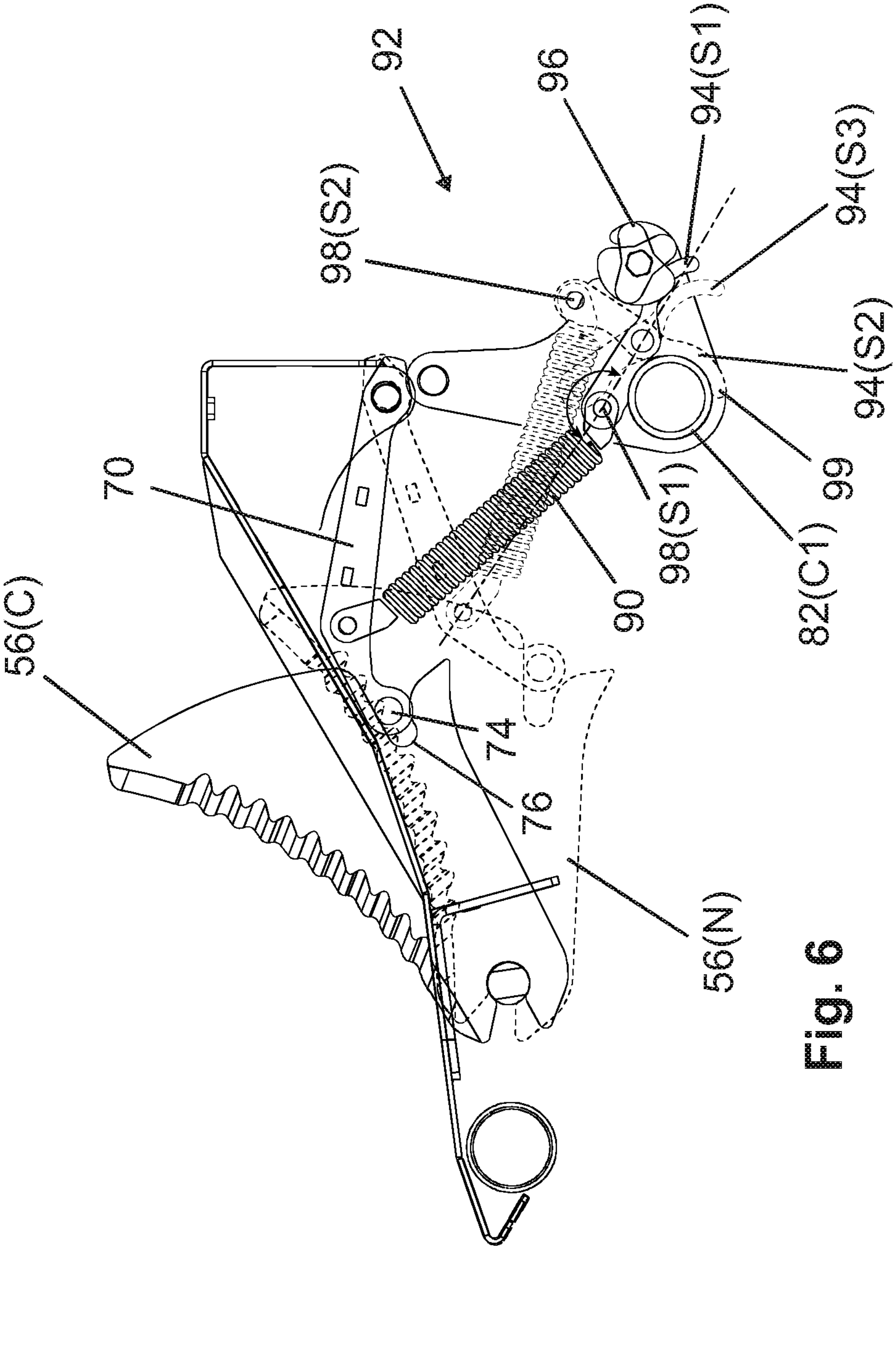
FIG. 6 is a side view of the knife mechanism, showing the knife in the cutting position and the non-cutting position, and showing the positioning device and a selection control in first and second positions.

FIG. 6 illustrates two different configurations of the selection mechanism 92 with the control element 82 in the secondary position S2. In the first configuration shown in solid lines, the knife 56 is held in the cutting position C by the positioning device 70. The selection lever 94 lies in the first position S1 in which the first end 98 of the selection lever 94 is pressed against the control element 82 by the connecting element 90.

In the second configuration shown in broken lines, the knife 56 is in the non-cutting position and the selection lever 94 is in the second position S2 in which the second end 99 of the selection lever 94 is pressed against the control element 82.

FIG. 7 is an isometric view of a base structure 104 of the cutting device, showing upper parts of a first set of knives 56(C) in the cutting position C and a second set of knives 56(N) in the non-cutting position N. In this embodiment the first and second sets of knives alternate along the length of the base structure 104. However, the knives may be arranged in differently in numerous alternative sets. Only the tips of the second set of knives 56(N) can be seen as the knives have been retracted through the slots 61 and are located almost entirely below the bottom plate 60. The first set of knives 56(C) extend through the slots 61 in the bottom plate 60 into the feed path of the bale material. A number of reinforcing plates 76 are attached to the upper surface of the bottom plate 60 to strengthen it and increase its rigidity.

An actuator 84 is connected to the control element 82 and is configured to move the control element between the primary position C1 and the secondary position C2 to move the selected knives 56 between the cutting position C and the non-cutting position N. An optional knife detachment handle 102 is shown removably attached to one end of the pivot shaft 62. The knife detachment handle 102 allows the pivot shaft 62 to be rotated about its axis from the locked configuration to the unlocked configuration, allowing the knife 56 to be removed by pulling it in the removal direction V.

The knife 56 is shown in more detail in FIG. 8. The knife 56 is approximately triangular in shape and has a cutting edge 59, which may optionally be serrated, a bottom edge 75 and a rear edge 77. A circular hole 57 is provided at the front end of the knife to receive the pivot shaft 62, allowing the knife 56 to pivot between the cutting position C and the non-cutting position N.

A shaft slot 58 extends from the hole 57 to the edge of the knife 56. In this embodiment the shaft slot 58 extends forwards from the hole 57 to the front end of the knife 56, but it could alternatively extend downwards. The minimum width W of the shaft slot 58 is less than the diameter D of the hole 57 and less than the diameter of the pivot shaft 62, but greater than the distance between the faces 64 of the pivot shaft 62. This allows the shaft 62 to pass through the shaft slot 58 when the slot 58 and the faces 64 are aligned. This enables the knife 56 to be detached from the shaft 62 and attached to the shaft. If the shaft slot 58 is not aligned with the faces 64 of the shaft 62 the knife 56 cannot be detached from the shaft 62.

The knife 56 includes the second engaging formation 76, which engages the first engaging formation 74 of the positioning device 70. The second engaging formation 76 is provided towards the rear end of the knife 56. In this embodiment the second engaging formation 76 comprises a slot that opens through the rear edge 77 of the knife 56 and extends forwards towards the pivot axis of the knife 56, which is defined by the axis of the pivot shaft 62 and the centre of the hole 57. The maximum length SL of the slot 76, which is typically measured from a rear edge 77 of the knife immediately adjacent the opening of the slot in a direction generally towards pivot hole 57, is greater than the maximum width of the slot SW, which is typically measured in a direction that is orthogonal to the slot length SL, and is generally oriented in a direction from the bottom edge 75 to towards the cutting edge 59. Typically, a first side wall 76*a* that defines the slot 76 includes a rectilinear portion that is arranged generally parallel to the bottom edge 75. As the rectilinear portion of the first side wall 76*a* approaches the rear edge 77, the first side wall 76*a* curves upwards, that is, in a direction away from the bottom edge 75. Typically, a second side wall 76*b* that defines the slot 76 flares away from the first side wall 76*a* in the direction of the rear edge 77. Typically, the first wall 76*a* is located above the second wall 76*b*, such that the second wall 76*b* flares outwards and downwards from the first wall 77*a*.

Optionally, the rear edge 77 extends at an angle of at least 60° relative to the bottom plate 60 so that it helps to prevent crop material being drawn into the opening in the bottom plate and helps to remove accumulated dirt from the slot 61 as the knife 56 moves from the cutting position C to the non-cutting position N.

FIGS. 9 to 13 illustrate movement of the knife 56 and interaction between the knife and the control mechanism 80 as the knife moves between its various positions.

Figure 9:
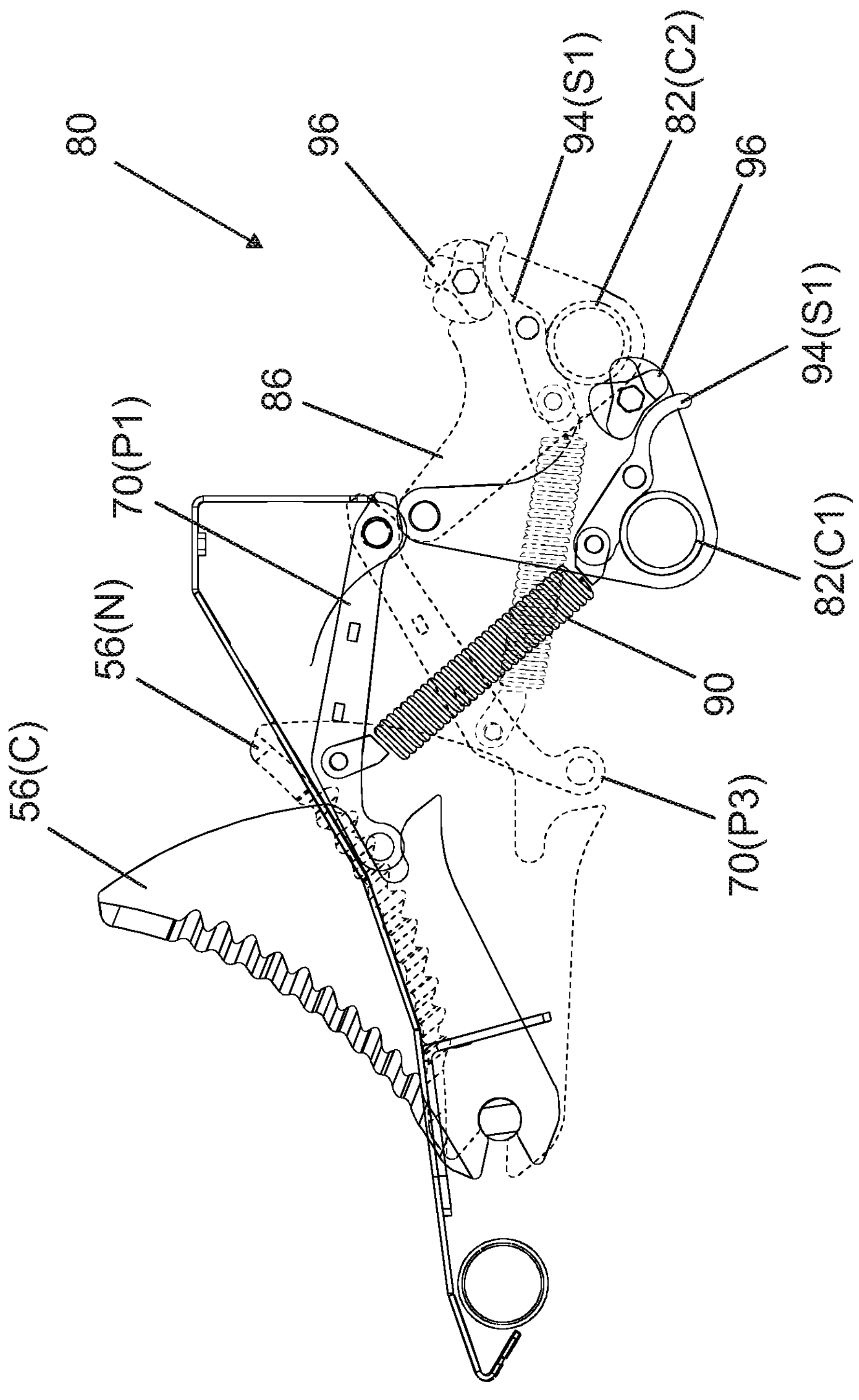
FIG. 9 is a side view of the knife mechanism, showing the knife in the cutting position and the non-cutting position, the positioning device in the first position and the third position, and the selection control in the first position.

In FIG. 9 the knife 56 is shown in solid lines in the cutting position C. The control element 82 is in the primary position C1 and the positioning device 70 is located in the first position P1 in which it is fully engaged with the second engaging formation 76 so that it holds the knife 56 in the cutting position C.

The knife 56 is also shown in broken lines in the non-cutting position N with the control element 82 in the secondary position C2 and the positioning device 70 in the third position P3, in which it is disengaged from the knife 56. Movement of the control element 82 from the secondary position C2 to the primary position C1 will cause the positioning device 70 to engage the second engaging formation 76 and move the knife 56 from the non-cutting position N to the cutting position C. In both configurations the selection device 96 is in the selection position and the selection lever 94 is in the first position S1 in which it is pressed against the control element 82, so that the knife 56 moves with the control element 82 between the cutting position C and the non-cutting position N.

Figure 10:
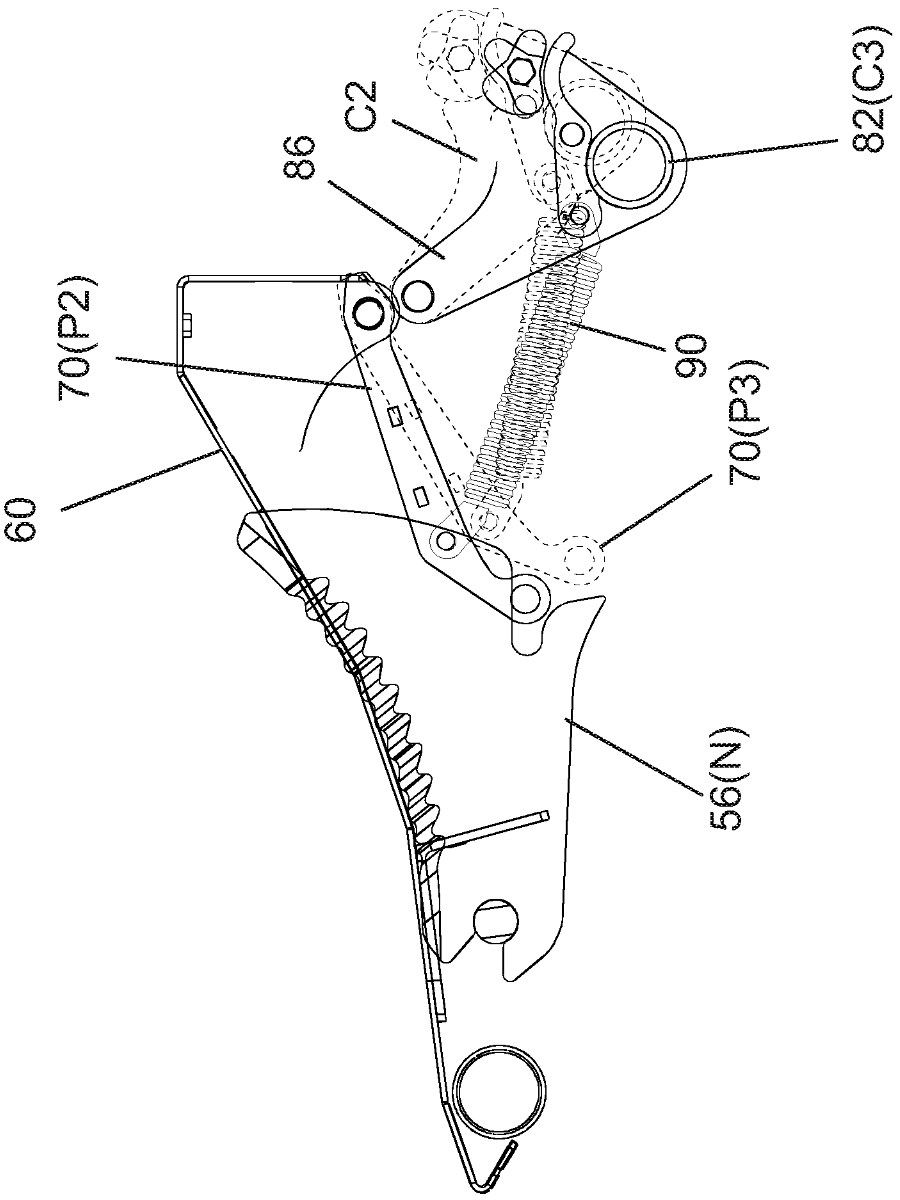
FIG. 10 is a side view of the knife mechanism, showing the knife in the non-cutting position, the positioning device in the second position and the third position, and the control element in an intermediate position in which the positioning element is catching the knife.

FIG. 10 shows the knife 56 in the non-cutting position N. The control element 82 is shown in solid lines in an intermediate position C3 as it moves between the secondary position C2 and the primary position C1. The selection device 96 is in the selection position so that the knife 56 moves with the control element 82. The positioning device 70 is shown in solid lines in the second position P2 in which it is engages with the second engaging formation 76 of the knife 56. The positioning device 70 is also shown in broken lines in the third position P3, in which it is disengaged from the knife 56. As noted above, movement of the control element 82 from the secondary position C2 towards the primary position C1 causes the positioning device 70 to engage the second engaging formation 76 and move the knife 56 from the non-cutting position N towards the cutting position C.

Figure 11:
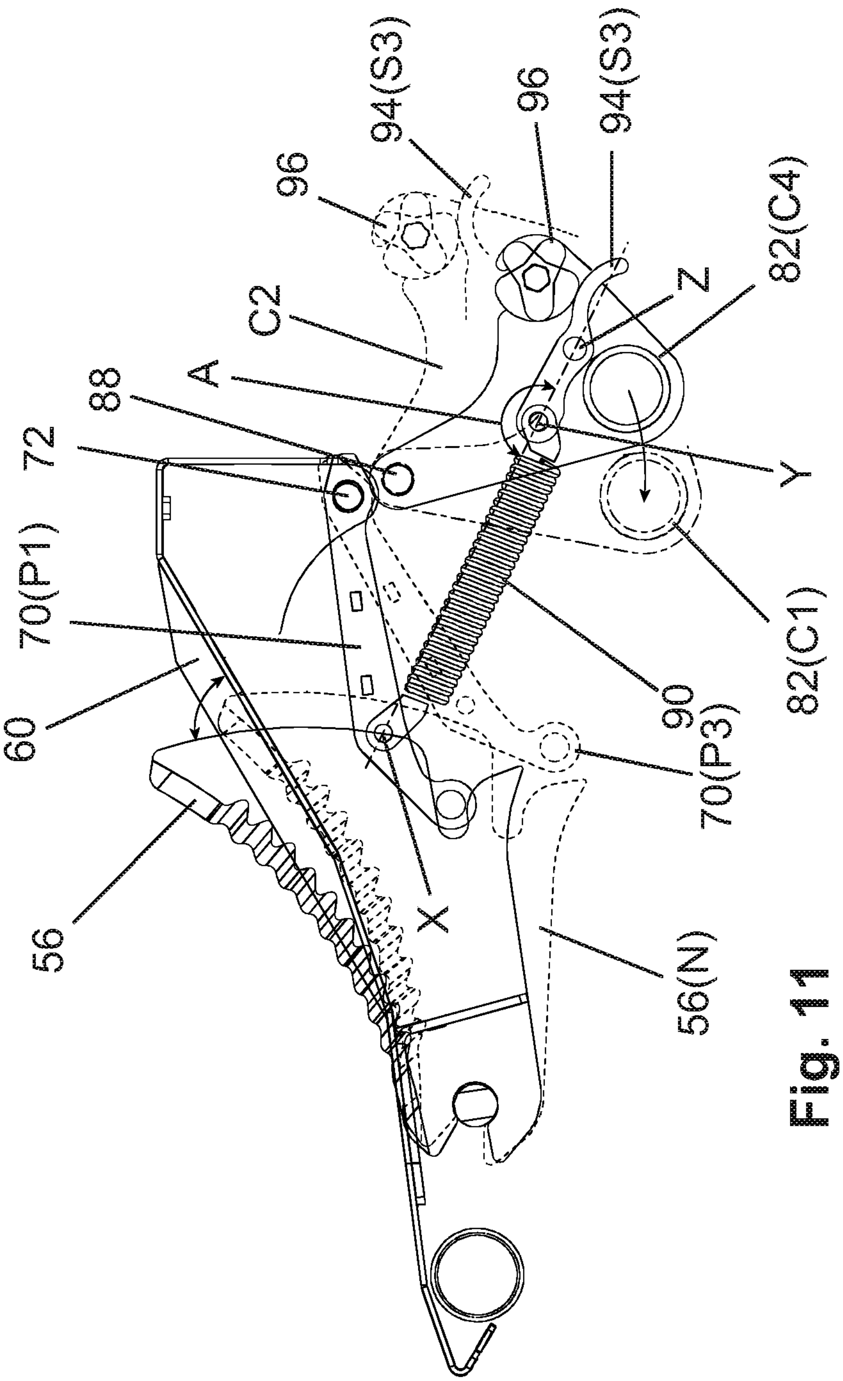
FIG. 11 is a side view of the knife mechanism, showing the knife in the non-cutting position and in an intermediate position between the cutting position and the non-cutting position, and showing the positioning device in the third position and an intermediate position in which the selection lever is tipping over to de-select the knife.
Figure 12:
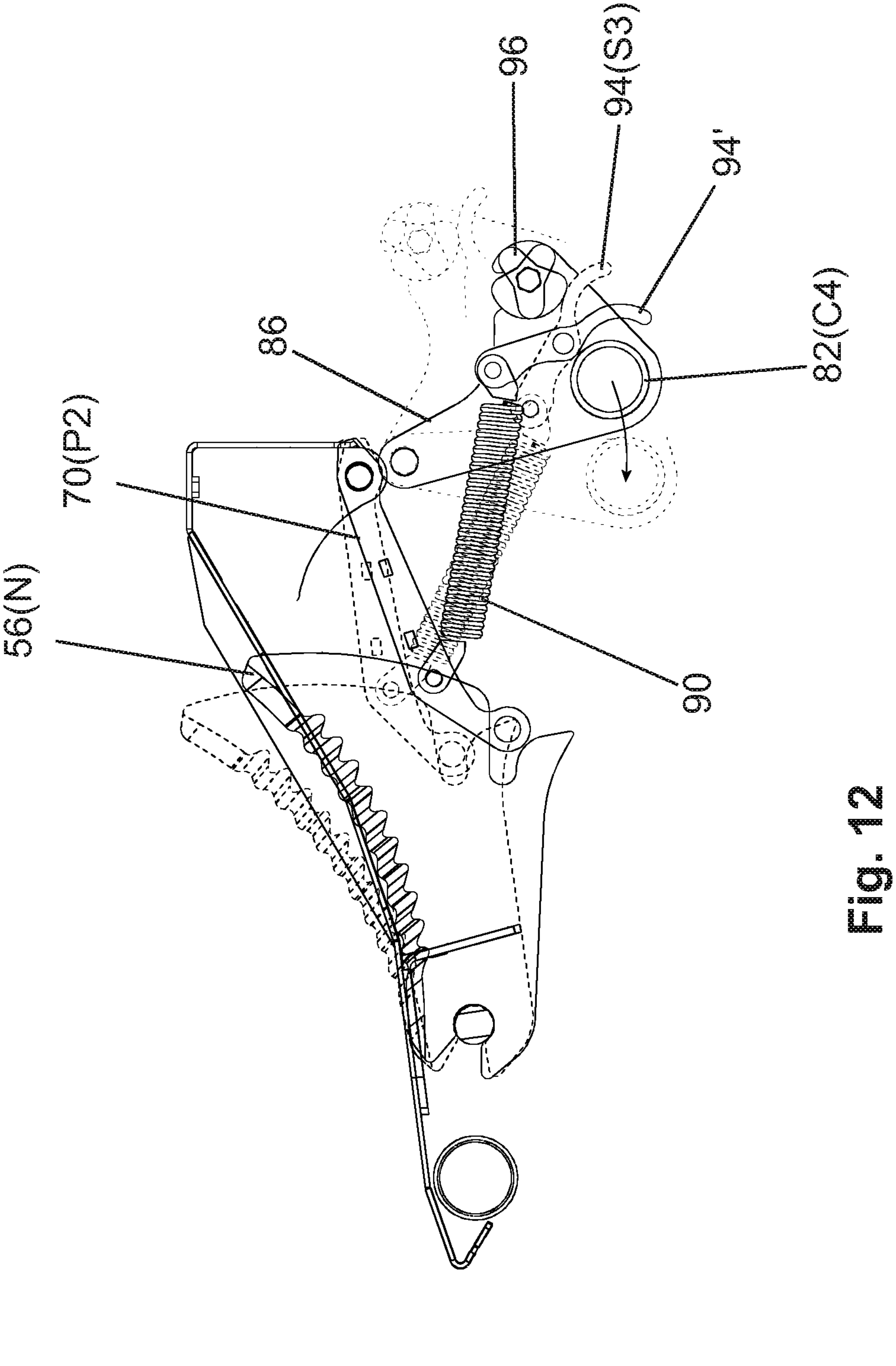
FIG. 12 is a side view of the knife mechanism, showing the knife in the non-cutting position and in an intermediate position between the cutting position and the non-cutting position, and showing the positioning device in the second position and an intermediate position where the selection lever is tipping over to de-select the knife.
Figure 13:
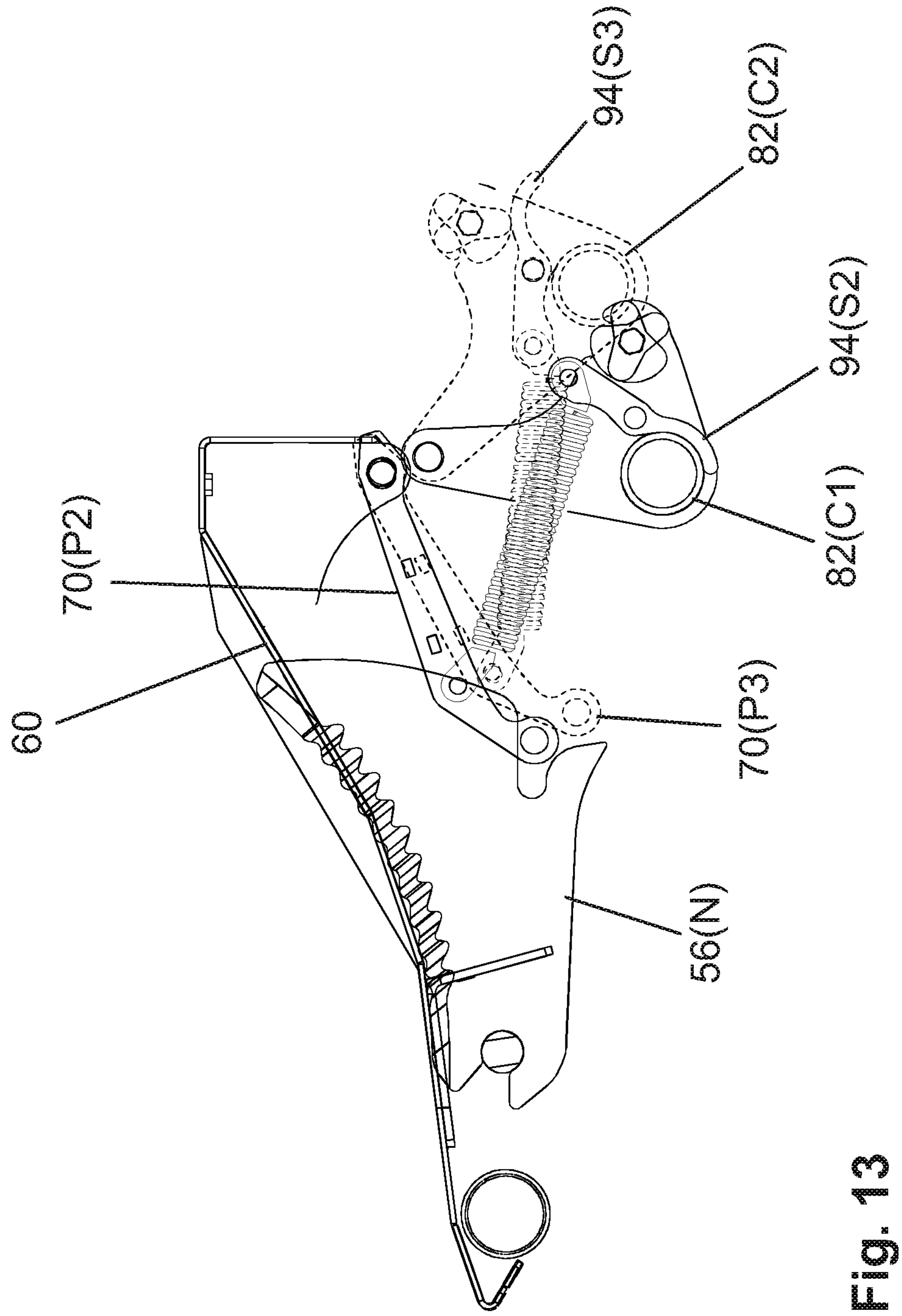
FIG. 13 is a side view of the knife mechanism, showing the knife in the non-cutting position, and showing the control element in the secondary position while the selection device has been activated to de-select the knife, and also showing the control element in the primary position whereby the selection lever is fully tipped over so that the knife is de-selected.

FIGS. 11 to 13 illustrate a process for deselecting a knife by disengaging the positioning device 70 so that the knife 56 can move to the non-cutting position N.

As shown in FIG. 11, when the control element 82 is in the C2 position shown in broken lines, the selection device 96 is rotated to the de-selection position in which the cam surface 97 pushes the selection lever 94 to the third position S3. The control element 82 then rotates forwards from the secondary position C2 to the primary position C1 through an intermediate position C4 shown in solid lines. In this intermediate position C4 the knife 56 is pushed to an intermediate position between the non-cutting position N and the cutting position C, which helps to remove any accumulated dirt from the slot in the bottom plate 60.

When the control element 82 reaches the intermediate position C4 shown in solid lines in FIG. 11 the axes of the three pivot points X, Y, Z of the positioning device 70 and the selection lever 94 are aligned. In other words, the angle A is equal to 180°, where A is the angle formed between a line that connects the pivot points X, Y of the connecting element 90 and a line that connects the pivot points Y, Z of the selection lever 94. It is noted that the angle A changes as the control element 82 moves from the secondary position C2 to the primary position C1 owing to the fact that the pivot axis 88 of the control element 82 is offset from the pivot axis 72 of the positioning device 70.

As soon as the control element 82 rotates from the secondary position C2 past the intermediate position C4 towards the primary position C1 that is shown in chain lines in FIG. 11, the angle A increases from less than 180° in C2, to more than 180° between C4 and C1 because the pivot axis 88 of the control element 82 is offset from the pivot axis 72 of the positioning device 70. The compressed connecting element 90 then causes the selection lever 94 to flip over to the second position S2 shown in FIG. 13. As a result, the positioning device 70 is not supported anymore allowing the knife 56 to fall or be pressed by bale material towards the non-cutting position N shown in broken lines in FIG. 11.

FIG. 12 shows the selection lever 94' in an intermediate position as it flips over from the third position S3 to the second position S2. The positioning device 70 is in position P2 and is no longer supporting the knife 56, allowing the knife 56 to move towards the non-cutting position N.

FIG. 13 shows the selection lever 94 in the second position S2 and the control element 82 in the first position C1. The knife 56 is in the non-cutting position N.

The invention claimed is:

1. A cutter device for an agricultural harvester, comprising:

a. a rotor with a plurality of tines, wherein the rotor is rotatable to transfer an agricultural crop along a feed path, b. at least one knife that is adjustable between (i) a cutting position in the feed path in which it cooperates with the rotor to cut the crop, and (ii) a non-cutting position in which it is withdrawn from the feed path, wherein the at least one knife is pivotable about a pivot axis located towards a front part of the knife, and c. a positioning device that controls movement of the knife between the cutting position and the non-cutting position, wherein the positioning device is adjustable between (i) a first position in which it positions the knife in the cutting position, (ii) a second position in which it positions the knife in the non-cutting position, and (iii) a third position in which it is disengaged from the knife to allow movement of the knife independently of the positioning device, wherein the positioning device is configured to engage the knife and prevent significant movement of the knife independently of the positioning device when the positioning device is in the first position and at intermediate positions between the first position and the second position.

2. The cutter device according to claim 1, wherein the pivot axis is defined by a pivot shaft, and wherein the pivot shaft and the knife have complementary locking formation that lock the knife to the pivot shaft in a first configuration and allow separation of the knife from the pivot shaft in a second configuration; wherein the pivot shaft and the knife are adjustable between the first configuration and the second configuration by relative rotation of the knife and the pivot shaft.

3. The cutter device according to claim 1, wherein the positioning device is configured to engage the knife at a location towards a rear part of the knife.

4. The cutter device according to claim 1, wherein the positioning device and the knife have complementary engaging formations configured to maintain engagement between the positioning device and the knife in the first position and all intermediate positions in between the first and the second position, and to permit disengagement of the positioning device from the knife in the third position at least in the direction of the cutting position; and the engaging formations are configured to limit relative movement between the positioning device and the knife in a tangential direction relative to the pivot axis of the knife, and to permit relative movement between the positioning device and the knife in a radial direction relative to the pivot axis of the knife.

5. The cutter device according to claim 4, wherein the positioning device is configured to disengage the knife in the third position by radial movement of the knife relative to the pivot axis.

6. The cutter device according to claim 4, wherein the engaging formations comprise a rearwards-facing slot that opens through a rear edge of the knife and an engaging element provided on the positioning device that engages the slot.

7. The cutter device according to claim 6, wherein the rearwards-facing slot extends substantially in the direction of the pivot axis of the knife.

8. The cutter device according to claim 1, wherein the positioning device is pivotable about a pivot axis of the positioning device, which is located towards a rear end of the positioning device.

9. The cutter device according to claim 1, wherein the positioning device is arranged such that when the knife is at an intermediate position approximately mid-way between the cutting position and the non-cutting position, there is substantial alignment between the pivot axis of the knife, the engaging formations and the pivot axis of the positioning device.

10. The cutter device according to claim 1, including a control mechanism that controls movement of the positioning device between the first position and the third position, wherein the control mechanism includes a control element that is connected to the positioning device, and an actuator that is connected to the control element and is configured to move the control element between a primary position and a secondary position.

11. The cutter device according to claim 10, wherein the control element is configured for pivoting movement about a pivot axis of the control element between the primary position and the secondary position.

12. The cutter device according to claim 11, wherein the pivot axis of the control element is offset from the pivot axis of the positioning device.

13. The cutter device according to claim 10, wherein the control mechanism includes a connecting element that is connected to the positioning device.

14. The cutter device according to claim 13, wherein the connecting element comprises a resilient element that is configured to enable movement of the positioning device relative to the control element by deformation of the resilient element.

15. The cutter device according to claim 10, wherein the control mechanism includes a selection device for selective connecting the positioning device to the control element.

16. The cutter device according to claim 15, wherein the selection device comprises a connecting element between the resilient element and the control element that controls the connection between the resilient element and control element.

17. The cutter device according to claim 1, including a bottom plate beneath the rotor, wherein the feed path is located between the rotor and the bottom plate; and wherein the knife has a rear edge that extends at an angle of at least 60° relative to the bottom plate.

18. The cutter device according to claim 1, wherein the cutter device includes a plurality of knives and each of the plurality of knives has a respective positioning device and respective selection device, wherein each respective selection device is arranged to select between a first operational mode wherein its respective knife is selected and a second operational mode wherein its respective knife is de-selected; wherein the plurality of knives are configured to move separately or together or in groups between the cutting and non-cutting positions.

19. An agricultural harvester comprising a crop pick-up device, a crop receiving station and a cutter device as defined by claim 1, wherein the cutter device is configured to transfer crop along a feed path from the crop pick-up device to the crop receiving station; wherein the agricultural harvester comprises a round baler, a square baler or a loading wagon.

20. A cutter device according to claim 14, wherein the resilient element comprises a kink spring, a coil spring or a flat spring.

21. A method of detaching a replaceable knife from a cutter device of an agricultural harvester, the cutter device comprising a rotor with a plurality of tines that is rotatable to transfer an agricultural crop along a feed path, at least one replaceable knife that is pivotable about a pivot shaft between a cutting position in the feed path in which it cooperates with the rotor to cut the crop, and a non-cutting position in which it is withdrawn from the feed path, and a positioning device that controls movement of the knife between the cutting position and the non-cutting position, wherein the positioning device is adjustable between a first position in which it positions the knife in the cutting position and a second position in which it positions the knife in the non-cutting position, wherein the positioning device is configured to engage the knife and prevent significant movement of the knife independently of the positioning device when the positioning device is in the first position and at intermediate positions between the first position and the second position, the method comprising:

a. moving the positioning device to a third position in which it is disengaged from the knife to allow movement of the knife independently of the positioning device from the non-cutting position towards and beyond the cutting position, b. rotating the knife from the non-cutting position towards and beyond the cutting position, and c. separating the knife from the pivot shaft.

22. A knife assembly for a cutter device for an agricultural harvester, the knife assembly comprising:

a knife comprising:

- a cutting edge comprising a top part of the knife, which is configured to cut an agricultural crop moving along a flow path over the knife,
- a circular hole formed in a front end of the knife and a shaft slot that extends forwards from the circular hole to the front end of the knife, and
- an engaging formation comprising a rearwards-facing slot that opens through a rear part of the knife for engaging a positioning device that controls pivoting movement of the knife between a cutting position and a non-cutting position, wherein the rearwards-facing slot extends substantially in the direction of a pivot axis of the knife, and the maximum length of the rewards-facing slot is greater than the maximum width of the rearwards-facing slot; and a pivot mechanism located towards a front part of the knife, the pivot mechanism comprising a pivot shaft that is partially circular in transverse cross section, wherein the pivot shaft is insertable into and removal from the circular hole via the shaft slot, and in a condition wherein the pivot shaft is located in the circular hole, the knife is rotatable about the pivot shaft.

23. The knife of claim 22, wherein the shaft slot extends forwards from the hole to the front end of the knife, the pivot shaft has a pair of flat faces, and a minimum width of the shaft slot is less than a diameter of the circular hole and less than a diameter of the pivot shaft, but greater than the distance between the pair of flat faces of the pivot shaft.

* * * * *